United States Patent [19]
Richter

[11] 4,219,092
[45] Aug. 26, 1980

[54] AUTOMATIC GUIDANCE APPARATUS
[76] Inventor: Wolfdieter Richter, P.O. Box 6144, Dunswart, Transvaal, South Africa
[21] Appl. No.: 770,027
[22] Filed: Feb. 18, 1977
[30] Foreign Application Priority Data
Feb. 28, 1976 [ZA] South Africa ............ 75/5471
[51] Int. Cl.² ............................................. B62D 1/28
[52] U.S. Cl. .................................. 180/169; 250/202; 250/363 R; 250/460; 318/587
[58] Field of Search ............... 180/98, 79, 79.1; 250/393, 460, 272, 273, 274, 363, 202; 318/577, 587; 118/4; 111/26

[56] References Cited
U.S. PATENT DOCUMENTS

| | | | |
|---|---|---|---|
| 2,074,251 | 3/1937 | Braun | 318/587 X |
| 2,520,680 | 8/1950 | Hamilton | 111/26 |
| 2,750,583 | 6/1956 | McCullough | 180/79.1 |
| 2,996,621 | 8/1961 | Barrett | 180/79.1 X |
| 3,004,258 | 10/1961 | Cohen | 250/393 X |
| 3,229,660 | 1/1966 | McLucas | 180/79 X |
| 3,298,352 | 1/1967 | Vrablik | 118/4 |
| 3,316,392 | 4/1967 | Bailey | 250/272 X |
| 3,403,254 | 9/1968 | Campanella | 250/393 X |
| 3,530,296 | 9/1970 | Lehtinen | 250/393 X |
| 4,003,445 | 1/1977 | DeBruine | 250/202 |

Primary Examiner—Joseph F. Peters, Jr.
Assistant Examiner—Donn McGiehan
Attorney, Agent, or Firm—Stevens, Davis, Miller & Mosher

[57] ABSTRACT

The invention relates to apparatus for automatically guiding a moving object such as a vehicle along a predetermined path, the apparatus including two detectors which are mounted in a spaced apart relationship on the object, the detectors being responsive to the intensity of electro-magnetic waves such as X-Rays emitted along the path. Comparison means for instance a dividing circuit is connected to the detectors to determine the ratios of the intensities of the magnetic waves and to provide a signal which is acted on by adjustment means that adjusts the direction of movement of the object to bring it back onto the path. The invention provides for irradiation means which is mounted on the object and which causes excitation and emission of secondary waves of pre-determined wavelength from the path.

9 Claims, 4 Drawing Figures

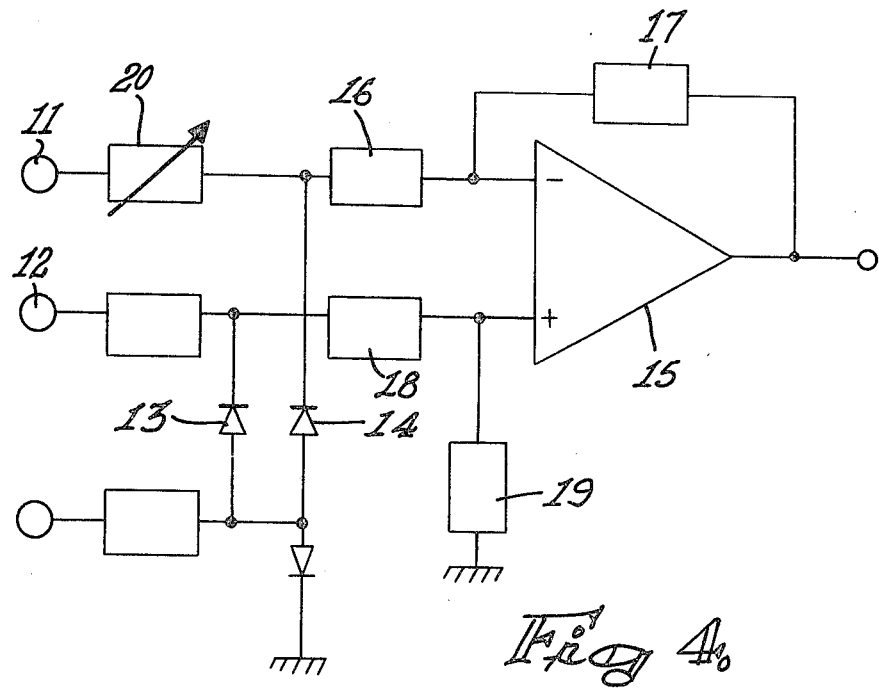
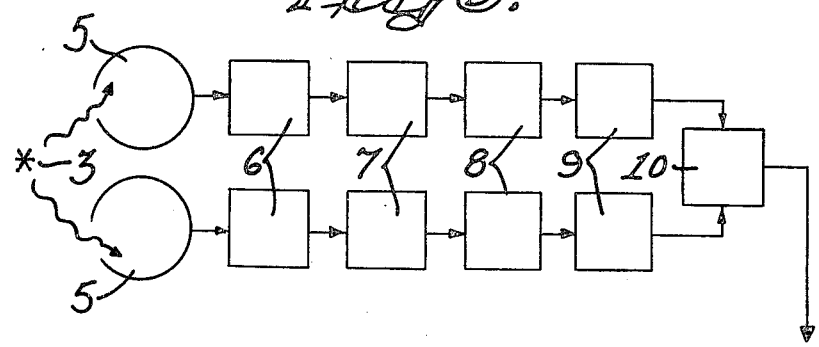

AUTOMATIC GUIDANCE APPARATUS

FIELD OF THE INVENTION

THIS INVENTION relates to a method of an apparatus for automatically guiding an object relative to a predetermined path.

More particularly, but not exclusively, the invention relates to the automatic guidance of a vehicle, for instance, in the applicaton of road markings.

BACKGROUND OF THE INVENTION

Various arrangements have been disclosed for automatically guiding a vehicle along a predetermined path. Thus, in French Pat. No. 1 464 063 (Oleomat) there is disclosed a guiding device for a road working machine which is activated by means of a modulated electromagnetic beam. A similar device is disclosed in French Pat. No. 1 592 195 (Leon) in which there is described a road marking machine guided by means of an electromagnetic line of sight. In French Pat. No. 1 411 945 (Leningradsky Institute) a device is described for automatically guiding the machine for road works which machine is activated by a light beam or laser beam. In this case, the receptive device mounted on the guided machine is sensitive only to the guiding beam. These arrangements have proved to be impractical because of extraneous influences due mainly to sunlight interference.

In order to overcome these difficulties, it has been proposed to incorporate a "source" in the path of the machine which source emits radiation of a characteristic wavelength to which a receptive device on the guided vehicle is responsive. Thus, in U.S. Pat. No. 2 520 680 (Hamilton) there is described a seed-planter which automatically deposits a seed each time the planter passes over a previously deposited marker of a radioactive or suitably magnetised material. In U.S. Pat. No. 2 750 583 (McCullough) the vehicle is guided by means of a radioactive guideline defining the travel path of the vehicle, the guideline emitting radiation energy which is received by a radiation detector on the vehicle for adjusting the travel direction of the vehicle relative to the path.

In U.S. Pat. No. 3 229 660 (Lucas) there is disclosed apparatus for controlling the steering mechanism of a vehicle comprising a device for detecting signal elements previously applied to or embedded in the pavement along which the vehicle is intended to travel, the device being arranged to automatically activate the steering mechanism of the vehicle to adjust its direction of travel relative to the pavement. In this arrangement, the signal elements can be previously applied with paint and can be detected by means of a photo-electric device. In a further arrangement of this invention, there is disclosed the use of radioactive material embedded in the pavement in accordance with a predetermined pattern to be painted.

These arrangements suffer from the disadvantage that the location of a radioactive material in the path along which the vehicle is to be guided can be very costly. Furthermore, the radioactive material decays with time thereby losing its effectiveness in guiding the vehicle along the path. Lastly, these arrangements suffer from the serious disadvantage that they are continuously emitting radiation energy which may be undesirable from the point of view of safety and health.

Vrablik (U.S. Pat. Specification No. 3 298 352) describes an automated painting device for road markings provided with a scanner system which includes one or more signal-emitting sources and a guidance system which is automatically activated by signals from a receiving device capable of detecting the waves which, after emission from the source, are reflected by the road surface. This invention suffers from the disadvantage that the scanners are liable to pick up interfering waves which originate from other sources and are reflected off the road to the scanner.

It is an object of the present invention to provide an effective method of and apparatus for guiding an object relative to a predetermined path.

SUMMARY OF THE INVENTION

According to the invention there is provided apparatus for automatically guiding a moving object relative to a predetermined path including:-
  two detectors adapted to be located in a spaced apart relationship on the object, the detectors being responsive to the intensity of electromagnetic waves of predetermined short wavelength emitted along the path;
  comparison means connected to the detectors for comparing and providing an output signal related to the intensities of the detected electromagnetic waves; and
  adjustment means connected to the comparison means for adjusting the direction of movement of the object relative to the path in accordance with the output signal received from the comparison means.

The apparatus may include irradiation means adapted to be located on the object for causing excitation and emission of secondary waves of the predetermined wavelength from along the path. Preferably, the irradiation means comprises a radioactive source and the electromagnetic waves are in the spectrum commonly referred to as X-rays.

Further according to the invention, the detectors include elements which are responsive to electromagnetic waves of the predetermined wavelength.

Also according to the invention, the comparison means comprises a dividing circuit.

The invention also includes within its scope a vehicle fitted with guidance apparatus as defined above wherein the adjustment means is adapted for operating the steering mechanism of the vehicle.

Another aspect of the invention is concerned with a method for automatically guiding a moving object relative to a path including the steps of
  providing emission means for the emission of electromagnetic waves of predetermined wavelengths along the path;
  detecting the intensities of the waves from spaced-apart positions on the object;
  comparing the detected wave intensities to obtain an electric signal related to the relative inequality between the detected intensities; and
  employing said signal to move the object to a predetermined position relative to the path.

Preferably, the emission means is irradiated with electromagnetic waves to cause a secondary emission of electromagnetic waves of a predetermined wavelength. In a preferred form of the invention, the electromagnetic waves caused to be emitted fall in the spectrum commonly referred to as X-rays.

DESCRIPTION OF THE DRAWINGS

By way of example only, preferred forms of the invention will now be described with reference to the accompanying drawings in which:

FIG. 3 shows a diagrammatic lay-out of the electronic system forming part of the apparatus;

FIG. 4 shows a diagrammatic lay-out of a dividing circuit forming part of the apparatus.

In FIGS. 1 and 2 there is shown a self-propelled vehicle 1 which is located on a road 2 near a line 3 applied on the road surface.

Figure 1:
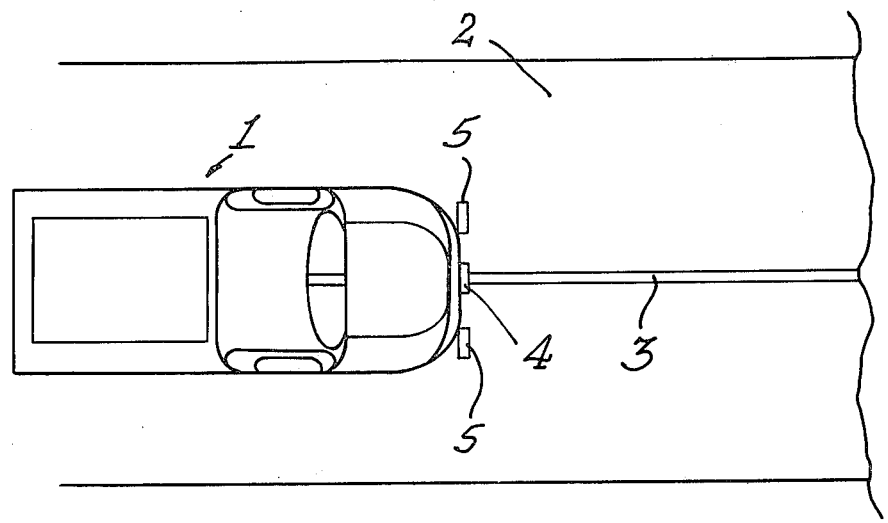
FIG. 1 is a diagrammatic plan view of a vehicle fitted with the apparatus and moving along a path.

The line 3 comprises a mixture of polypropylene and bitumen containing about 60% by weight of zinc powder. Such line is applied in an extrusion operation effected while the mixture is hot to the surface of the road which is preferably of the type having a permanent surface such as in macadamised roads.

The vehicle 1 is fitted with a source 4 of electromagnetic waves falling in the spectrum commonly referred to as X-rays. Plutonium-238 of 100 mCl which emits the L-series of characteristic X-rays of uranium (13 to 20 keV) has been found to be particularly efficient in exciting the characteristic 8,6 and 9,6 keV X-ray emissions from a zinc or zinc-rich compound, which emissions correspond to Zn K$\alpha$ and K$\beta$ lines respectively. Such source of X-rays is readily available on the market.

The vehicle is fitted with detectors comprising xenon-filled proportional counters which are responsvie to the Zn K$\alpha$ and K$\beta$ emissions and which allow, at the same time, energy resolution which is sufficiently high to separate the K-X-rays of zinc from those of iron, an element which may be present in large quantities in the road. The detectors are fitted with conventional filters (not shown) capable of excluding iron K-X-rays at the zinc K-X-ray peak.

Each detector 5 is coupled in turn to a pre-amplifier 6, a linear amplifier 7, a single channel analyzer 8 and a low pass filter 9. These single channel analyzers are pulse-height sensitive and are adjusted to allow through those signals which are caused by zinc X-rays but will block off those which are caused by most other elements, including iron. The output from the two filters 9 is processed in a suitable divider 10, for instance, a conventional analogue-divider (see FIG. 4).

The circuit for a typical analogue-divider indicated in FIG. 3 by reference numeral 10 is shown in FIG. 4. The outputs from the filters 9 are fed into inputs 11, 12 of the analogue divider. The voltages thus developed across diodes 13, 14 are proportional to the logarithms of the voltages at 11, 12. These voltages are subtracted from each other by the operational amplifier 15, thus producing an output proportional to the logarithm of the ratio of the voltages at 12 to the voltage at 11. Resistors 16, 17 and 18, 19 are used to determine the gain of the operational amplifier 15 and variable resistance 20 is used to adjust the output to zero volts when 11 and 12 are at the same potential.

It is to be appreciated that the intensity of the X-rays sensed by each detector is related to the distance between the detector and the line 3 and hence to the deviation of the vehicle from the line. Furthermore, the ratio of intensities sensed is also related to this deviation and the value of the ratio will indicated both the extent of the deviation and whether the deviation is to the left or to the right of the line 3.

The reason for working with the ratio and not with the differences between the two count rates arises out of the fact that in this manner the output of the analogue divider is, within certain limits, insensitive to a variation in the distance between the detector and the plane in which the target, that is, the line is located.

The analogue-dividing circuit is connected to adjustment or control means of a servo-mechanism. A conventional servo-mechanism may be used. Thus, there may be provided an electric, mechanical, or hydraulic mechanism which operates on the steering mechanism of the vehicle in response to the value of the voltage ratio as outlined above in several of the cited patents to adjust the direction of its travel relative to the line in a manner which overcomes any deviation on either side of the line 3.

In use the vehicle is positioned on the road over the line 3. The vehicle is then set in motion and the apparatus brought into operation. As the vehicle moves along the line, the line is irradiated by the source of X-rays which causes characteristic X-rays thereby to be emitted. In the manner described above, the X-rays are employed to activate the steering mechanism of the vehicle so that the vehicle is maintained in a predetermined position relative to the line. The vehicle is thus automatically guided along a desired path, that is, relative to the line in an effective manner by means of X-ray fluorescence.

Figure 2:
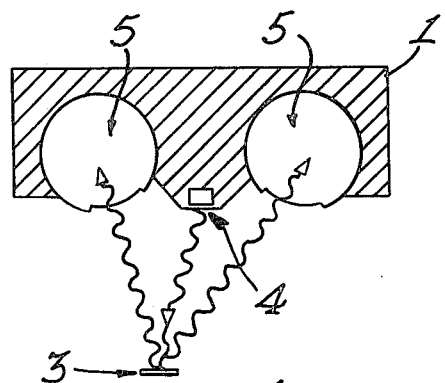
FIG. 2 is a diagrammatic lay-out showing the detectors and irradiation means forming part of the apparatus and their location relative to a path.

Although the detectors are shown located in FIG. 2 on opposite sides of the line, this is not necessary and the vehicle and detectors or the vehicle only, could well be located to one side of the line in which case the output signal from the electric circuitry is employed to maintain the vehicle in this predetermined location relative to the line. Provision may be made in the guidance means for calibrating the detectors to compensate for inherent differences in the sensitivity of the detectors.

One practical application of this form of the invention lies in road marking. Either during the surfacing of the road a zinc strip is incorporated in the road surface at a position relative to where the road is to be marked or after completion of the road, a stripe is applied to the road surface. Once the stripe has been applied it is an easy matter to locate the vehicle fitted with apparatus according to the invention in position relative to the stripe and then to set the vehicle in motion. By means of the apparatus, the vehicle is automatically guided along the stripe.

Other applications of the apparatus are possible. Thus, the apparatus may be used in guiding aircraft along runways and on aprons in adverse weather conditions. In this case, the aircraft would be fitted with the apparatus and the stripe would be located on the runways and airport aprons.

The apparatus can also be used in public transport systems for guiding a vehicle automatically along a route defined by stripes as described above.

Also, more than one line marking could be provided. In a public transport system, for instance, two or more parallel, spaced lines could be applied to a surface with the one line or outer lines being employed to define the outer limit or limits of possible deviation of the vehicle. In this case, more than two detectors could be used with certain of the detectors arranged to monitor readings from the one line or the outer lines.

The invention may also be used in military applications, for instance, to automatically guide vehicles along a selected and possibly mined route. In this case, the apparatus could be provided with alarm means which is activated when an interruption in a continuous line marking occurs, for instance, due to excavation made in the road for the laying of a mine.

Other forms of this embodiment of the invention exist. Thus, instead of having a continuous line, a series of dots or dashes may be provided. The line may also be in the form of a tape which is applied to the road surface, or a filament, i.e. a wire. While zinc has proved to be particularly useful, other elements providing an X-ray fluorescence which can be distinguished from the "background" on being irradiated, may be used.

Although the electronic circuit described above operates on the basis of the ratio of the detected X-ray intensities, this is not essential and use could equally well be made of the difference in magnitude of the intensities. Other types of detector may be used, for instance, photo-multiplier tubes can also be used.

I claim:

1. Apparatus suitable for automatically guiding a moving object relative to a predetermined path defined by a stripe of material capable of emitting, upon X-ray irradiation thereof, secondary X-ray waves characteristic of said material comprising:
   radiation means mountable on the object for irradiating the path with electromagnetic waves of a wavelength chosen within the X-ray spectrum to cause excitation and emission of secondary X-ray waves of a predetermined wavelength from the stripe defining the path;
   two detectors located in a spaced-apart relationship on the object, the detectors being selectively responsive to the intensity of the characteristic secondary X-ray waves emitted from said stripe;
   comparison means connected to the detectors for comparing the detector outputs and providing an output signal related to the intensities of the detected characteristic secondary X-ray waves; and
   servo means connected to the comparison means for adjusting the direction of movement of the object relative to the path in accordance with the output signal received from the comparison means.

2. An apparatus as claimed in claim 1 wherein said object is a vehicle upon which said apparatus is mounted.

3. An apparatus as claimed in claim 2 wherein said vehicle is equipped with means for applying road markings to roads.

4. An apparatus as claimed in claim 1 wherein said detectors are proportional counters.

5. An apparatus as claimed in claim 4 wherein said detectors are Xenon-filled proportional counters.

6. An apparatus as claimed in claim 1 wherein said radiation means in Plutonium-238.

7. An apparatus as claimed in claim 1 wherein said comparison means provides an output which is a ratio of the intensities detected by said two detectors.

8. A method for automatically guiding a moving object relative to a path defined by a stripe of material capable of emitting, upon X-ray irradiation thereof, secondary X-ray waves characteristic of said material, comprising the steps of:
   irradiating a path from a source on the object with electromagnetic waves of a wavelength chosen within the X-ray spectrum for causing excitation and emission of characteristic secondary X-ray waves of predetermined wavelength from the stripe defining the path;
   detecting the intensities of the characteristic secondary X-ray waves, emitted along the path, from spaced apart positions on the object;
   comparing the detected characteristic secondary X-ray wave intensities to obtain an electric signal related to the relative inequality between the detected intensities; and
   adjusting the position of the object to a predetermined position relative to the path in response to said electric signal.

9. A method as claimed in claim 8 wherein said electrical signal is fed to a servo unit operating to steer said object to maintain its position relative to said path.

* * * * *